United States Patent [19]

Adachi

[11] 4,137,341

[45] Jan. 30, 1979

[54] METHOD FOR COATING A LOOP OF A SEAL EDGE OF A CATHODE RAY TUBE WITH VISCOUS MATERIAL

[75] Inventor: Hiroshi Adachi, Yokohama, Japan

[73] Assignee: Sony Corporation, Tokyo, Japan

[21] Appl. No.: 893,431

[22] Filed: Apr. 4, 1978

Related U.S. Application Data

[63] Continuation of Ser. No. 692,328, Jun. 3, 1976, abandoned.

[51] Int. Cl.[2] ........................ C03C 17/00; C03C 17/04

[52] U.S. Cl. .......................................... 427/64; 65/36; 65/43; 118/240; 118/255; 118/323; 118/411; 118/412; 156/89; 156/107; 427/279; 427/284; 427/72

[58] Field of Search .......................... 156/89, 107, 109; 65/36, 43; 427/72, 279, 284, 64; 118/411, 412, 323, 240, 255

[56] References Cited

U.S. PATENT DOCUMENTS

| | | | |
|---|---|---|---|
| 2,294,472 | 9/1942 | MacKenzie | 118/411 |
| 2,959,493 | 11/1960 | Vincent | 427/284 |
| 3,492,146 | 1/1970 | Kornaker | 427/72 |
| 3,701,674 | 10/1972 | Kimbrough | 427/72 |
| 3,759,771 | 9/1973 | Battersby | 156/109 |
| 3,947,311 | 3/1976 | Jarchow et al. | 156/107 |
| 4,069,354 | 1/1978 | Pekosh | 427/72 |

*Primary Examiner*—John D. Smith

*Attorney, Agent, or Firm*—Lewis H. Eslinger; Alvin Sinderbrand

[57] ABSTRACT

A method and apparatus for coating a seal edge of a funnel portion of a television cathode ray tube with frit slurry, which method includes the steps of arranging at least one pair of nozzle bodies containing frit slurry adjacent to the seal edge, predetermining initial points and terminal points on the seal edge corresponding to the number of pairs of nozzle bodies, moving the paired nozzle bodies from one of the initial points, in opposite directions, along the seal edge while discharging the viscous material on the seal edge and having two of the nozzle bodies meeting each other at one of the terminal points. The whole seal edge is in this manner coated with a continuous uniform layer of frit slurry.

8 Claims, 6 Drawing Figures

METHOD FOR COATING A LOOP OF A SEAL EDGE OF A CATHODE RAY TUBE WITH VISCOUS MATERIAL

This is a continuation of application Ser. No. 692,328, filed June 3, 1976 now abandoned.

BACKGROUND OF THE INVENTION

1. Field of the Invention

This invention relates to a method and apparatus for coating a loop with viscous material, and particularly to a method for coating a seal edge of a funnel portion of a television cathode ray tube with frit slurry in order to fix the seal edge of the funnel portion to an end surface of a panel portion of the television cathode ray tube.

2. Description of the Prior Art

As shown in FIG. 1, when a picture tube or a television cathode ray tube is manufactured, a funnel portion 1 and a nearly rectangular bowl-shaped panel portion 2 are prepared, and they are attached to each other at their end surfaces. In the attaching operation, an end surface or seal edge 1*a* of the funnel portion 1 is coated with a so called frit slurry. For example, a typical frit slurry composition contains 10 kg frit (Asahi 1307-Tradename-manufactured by Asahi Glass Co., Ltd.) which consists of 70% PbO, 13% ZnO and the remainder $SiO_2$ and $B_2O_3$, and 900 to 1000 cc of a carried therefor consisting of isoamyl acetate solvent and 1.1 to 1.3% by weight, based on weight of the carrier of nitrocellulose wetted with isopropyl alcohol as a binder.

The FIG. 2 shows a prespective view of a known apparatus for coating the seal edge l*a* of the funnel portion 1 with frit slurry and the principal of operation of the apparatus. In the FIG. 2 apparatus, the funnel portion 1 is rotated around its central axis in a counterclockwise direction by a supporting member (not shown). A nozzle body 3 containing frit slurry is arranged so as to be urged towards the central axis of the funnel portion 1. A follower portion (not shown) is formed integrally with the nozzle body 3 and is pressed against and follows an outside marginal portion of the funnel portion 1. Accordingly, the nozzle body 3 is guided along the seal edge 1*a* of the funnel portion 1 with the rotation of the funnel portion 1. Frit slurry is discharged towards the seal edge 1*a* from the outlet opening of the nozzle body 3 at a constant rate, so that the whole seal edge 1*a* of the funnel portion 1 is coated with frit slurry. In such a method and apparatus, the coating operation starts on an initial point of the seal edge 1*a*, and ends on a terminal point of the seal edge 1*a* after making one circuit of the seal edge 1*a*. The initial point coincides approximately with the terminal point. During the coating operation, the frit slurry discharged on the seal edge 1*a* gradually becomes hard due to its thixotropy and vaporization of the solvent of the frit slurry and contracts somewhat as it hardens. Accordingly, a slight double layer of frit slurry is formed on the terminal point of the seal edge 1*a* so as to satisfactorily combine both ends of the coated layer of frit slurry. When frit slurry is discharged onto the terminal point, that is onto the initial point or slightly beyond the initial point after making one circuit of the seal edge 1*a*, the layer of frit slurry swells and projects slightly above the terminal or initial point of the seal edge 1*a*. The thickness of the layer of frit slurry is thus not uniform at the initial or terminal point of the seal edge 1*a*. Moreover frit slurry somewhat flows out to the outside marginal portion of the funnel portion 1 from the terminal or initial point. Thus, neither the height nor the width of the terminal or initial point are uniform with the remainder of the slurry. Because of the lack of uniformity of the height and/or width of the slurry, the panel portion 2 cannot be exactly fitted to the funnel portion 1. Heretofore, the nonuniform points has been manually corrected with a knife or spatula to cut away the excess frit slurry material. However, such an operation requires considerable skill, and it has been an obstacle to the efficient manufacture of the cathode ray tube.

Moreover, particles of frit slurry are often scattered about in the manual correction operation. The particles are deposited on different parts of the funnel portion 1. There is a possibility that the scattered particles of frit slurry causes deterioration of the insulation or conductivity of different parts of the cathode ray tube so as to shorten the life time of the cathode ray tube, and that the scattered particles of frit slurry have an adverse influence on the picture of the cathode ray tube. Moreover, frit slurry is harmful to the health of factory assembly personnel and a considerable expense is involved in protecting assembly personnel from the particles of frit slurry.

SUMMARY OF THE INVENTION

In accordance with the present invention a continuous unform coating of viscous material is applied to a loop by a novel method and apparatus, the method steps of which comprise arranging at least one pair of nozzle bodies containing viscous material adjacent to a loop, predetermining initial points and terminal points on the loop corresponding to the number of pairs of nozzle bodies, moving the paired nozzle body bodies, in opposite directions, from one of the initial points along the loop while discharging the viscous material onto the loop, and having two of the nozzle bodies meet with each other at one of the terminal points, whereby the whole loop is coated with the viscous material.

An object of this invention is to provide a method and apparatus for coating a loop with viscous material which can overcome the disadvantages of the conventional method using one nozzle body, and can avoid forming any swollen or nonuniform portion of a coated layer of viscous material on the loop.

Another object of this invention is to provide a method for coating a loop with viscous material by which the loop can be automatically coated with viscous material.

A further object of this invention is to provide a method for coating a seal edge of a funnel portion of a television cathode ray tube by which the insulation and/or conductivity of the parts of the cathode ray tube are not adversely affected by particles of frit slurry.

A still further object of the present invention is to provide a novel apparatus for automatically coating a loop with viscous material.

These and other objects, features and advantages of the invention will become apparent from the following detailed description of illustrative embodiments shown in the accompanying drawings.

DETAILED DESCRIPTION OF THE INVENTION

Figure 1:
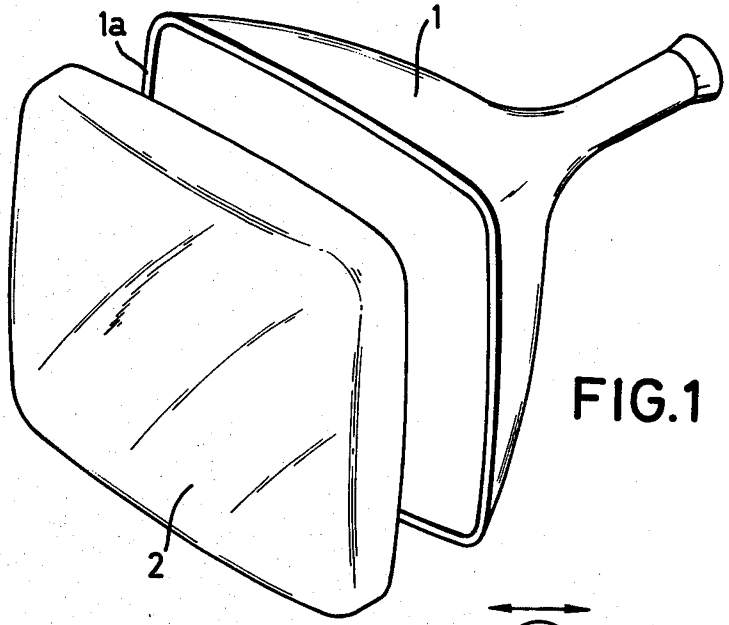
FIG. 1 shows a perspective view of a funnel portion and panel portion of a television cathode ray tube treated in accordance with this invention.
Figure 2:
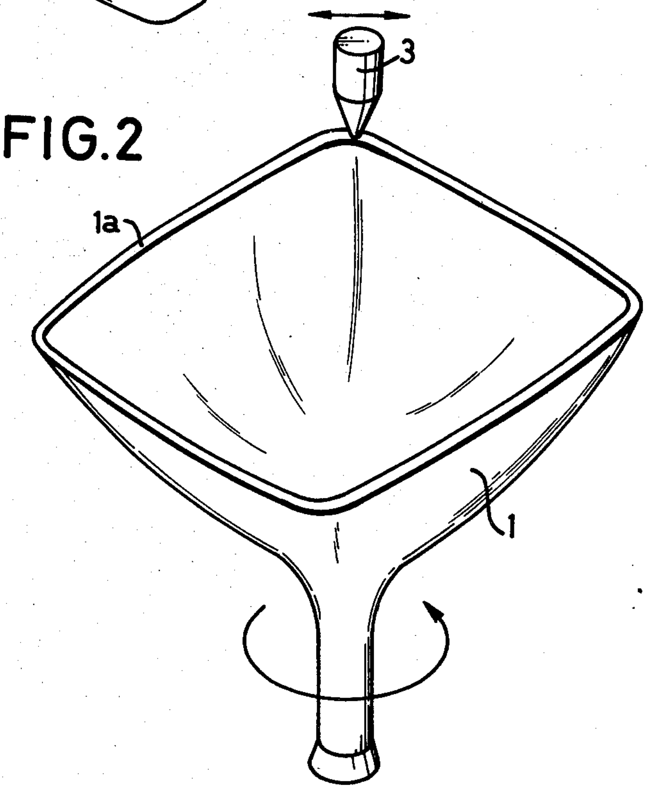
FIG. 2 shows a schematic perspective view illustrating a conventional prior art method for coating a seal edge of a funnel portion with frit slurry.
Figure 3:
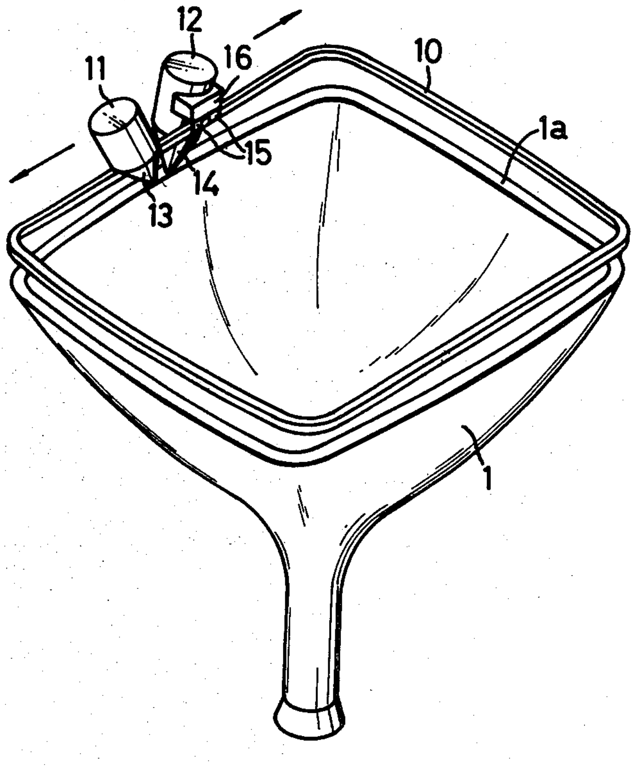
FIG. 3 shows a schematic perspective view of a coating apparatus according to an embodiment of the invention.
Figure 4:
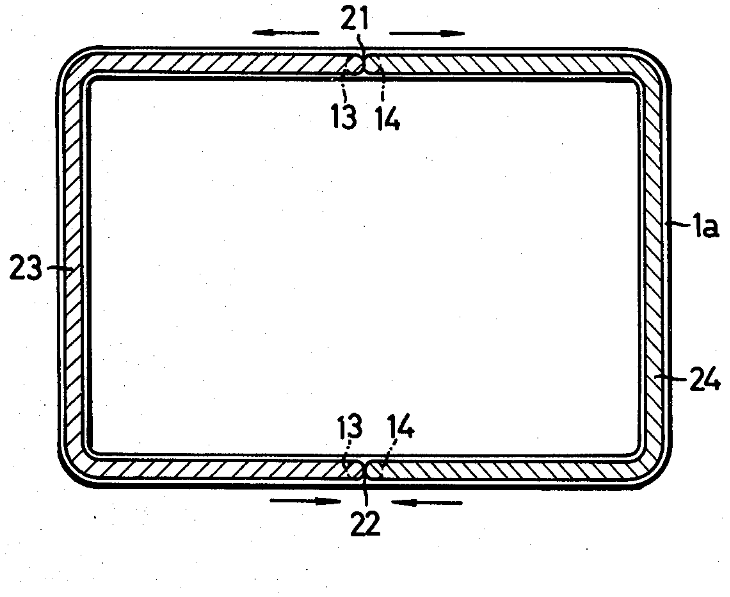
FIG. 4 shows a plane view illustrating an operation of the coating apparatus of FIG. 3.

An embodiment of the invention is described with reference to FIGS. 3 and 4. In FIG. 3, a funnel 1 is supported by a supporting member (not shown) so that an end surface or seal edge 1*a* of the funnel 1 is in a horizontal plane. A guide rail 10 having a shape similar to the seal edge 1*a* is supported over the seal edge 1*a* by an other supporting member (not shown) so as to be in a horizontal plane and to be concentric with the seal edge 1*a*.

A pair of frit pots 11 and 12, i.e. nozzle bodies, having nozzle portions 13 and 14 is guided along the guide rail 10. The frit pots 11 and 12 contain frit slurry. Guide brackets 15 are attached to each of the frit pots 11 and 12 and the frit pots 11 and 12 are each attached to drive members 16 which are connected to a drive mechanism (not shown). The guide bracket 15 and drive member 16 of frit pot 11 are for clarity not shown. The frit pots 11 and 12 are moved along the guide rail 10 in opposite directions through the drive members 16 by the drive mechanism (not shown).

The operation of the above-described embodiment is as follows. As shown in FIGS. 3 and 4, the nozzle portions 13 and 14 of frit pots 11 and 12 are initially adjacent to each other at an initial point 21 (FIG. 4). Shutters, i.e. valve means (not shown), of the nozzle portions 13 and 14 are opened. With the energizing of the drive mechanism, the frit pots 11 and 12 are moved along the guide rail 10 in opposite directions at a predetermined speed, as shown by the arrows in FIGS. 3 and 4. The layers 23 and 24 of the frit slurry, see FIG. 4, having predetermined thickness and width are formed on the seal edge 1*a* of the funnel 1. The nozzle portions 13 and 14 of the frit pots 11 and 12 meet with each other at a terminal point 22 after making half a circuit of the seal edge 1*a* and the shutters of the nozzle portions 13 and 14 are closed to stop the discharge of frit slurry from the nozzle portions 13 and 14. The position of the initial point 21 where the nozzle portions 13 and 14 are opened and the position of the terminal point 22 where they are closed are shown by the dot-dash circle lines in FIG. 4. The frit slurry coating operation is at point 22 completed.

Since frit slurry is discharged from the nozzle portions 13 and 14 at the same time, both at the initial and terminal points 21 and 22 of the seal edge 1*a*, the frit slurry from the one nozzle portion 13 is uniformly mingled with the frit slurry from the other nozzle portion 14, so that one continuous unform layer of frit slurry is formed on the seal edge 1*a*. According to this invention, there is no nonuniform portion formed in the layer of frit slurry at either the initial point or terminal point of application of the frit slurry.

Figure 5:
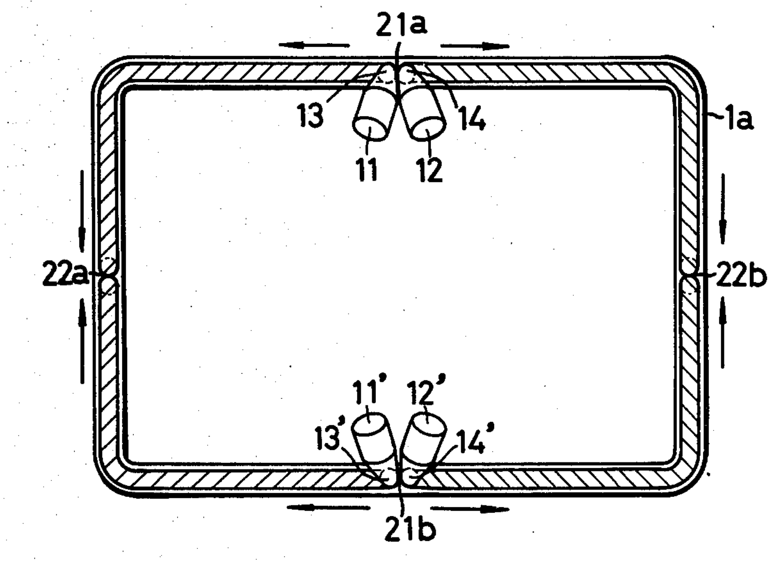
FIG. 5 shows a plane view illustrating another embodiment of this invention.

FIG. 5 shows another embodiment of the invention. In this embodiment two pairs of frit pots 11 (11') and 12 (12') having nozzle portions 13 (13') and 14 (14') are used for coating the seal edge 1*a* with frit slurry. One pair of frit pots 11 and 12 is initially positioned at one initial point 21*a*, while another pair of frit pots 11' and 12' is initially positioned at another initial point 21*b*. With the energizing of the drive mechanism (not shown), the frit pots 11 and 12, and 11' and 12' are moved along a guide rail (see FIG. 3), in opposite directions, at a predetermined speed, as shown by the arrows in FIG. 5. The frit pots 11 and 11' each having made a quarter of one circuit of the seal edge 1*a*, meet and stop at one terminal point 22*a*. At the same time the other frit pots 12 and 12', after each having made a quarter of one circuit of the seal edge 1*a*, meet and stop at another terminal point 22*b*. As in the first embodiment, a continuous uniform layer of frit slurry is formed on the seal edge 1*a*. The positions of the nozzle portions 13 and 13', and 14 and 14' at the initial points 21*a* and 21*b* and at the terminal points 22*a* and 22*b* are shown by the dot-dash circle lines in FIG. 5.

Figure 6:
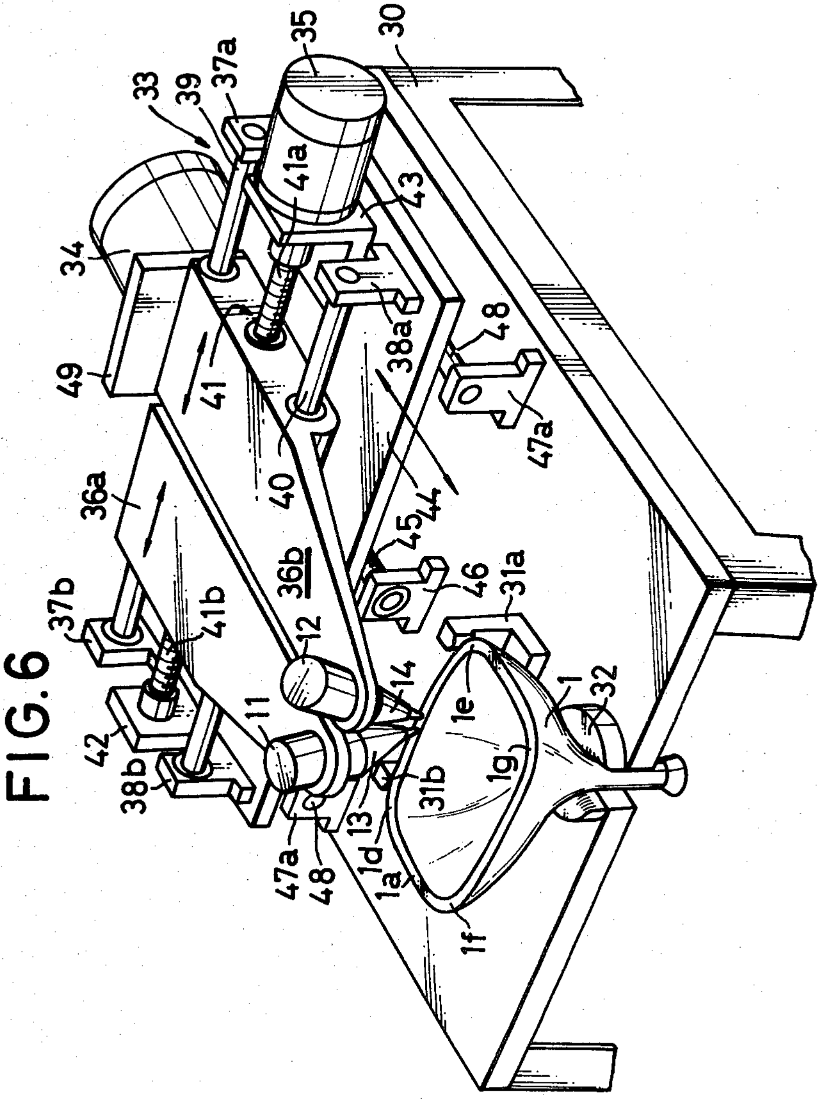
FIG. 6 shows a perspective view of a coating apparatus according to a further embodiment of this invention.

FIG. 6 shows a perspective view of a coating apparatus used according to a further embodiment of the invention. The parts of the apparatus which correspond to parts of the above-described embodiments are denoted by the same reference numerals and will not be further described. The whole apparatus is mounted on a bench 30. The funnel 1 is supported by a funnel supporter 32 fixed on bench 30, and held in its upright position by a pair of holding members 31*a* and 31*b* which are generally L-shaped and fixed on bench 30, so that the seal edge 1*a* of the funnel 1 faces upwardly and is disposed in a horizontal plane.

A drive mechanism 33 is mounted on bench 30 behind the supported funnel 1. The frit pots 11 and 12 are inclined toward each other and are attached to a pair of transport plates 36*a* and 36*b* which are slidably supported by a pair of rods 39 and 40. The rods 39 and 40 are connected to supporting members 37*a* and 37*b*, and 38*a* and 38*b*, at both ends, respectively. The supporting members 37*a*, 37*b*, 38*a* and 38*b* are fixedly connected to a transport table 44. An NC (numerical control) motor 35 for laterally transporting the frit pots 11 and 12 is mounted on a supporting member 43 on the transport table 44. A shaft 41 of the NC motor 35 is rotatably supported at one end by support member 42 and is inserted through the transport plates 36*a* and 36*b*. The shaft 41 comprises shaft portions 41*a* and 41*b* which are threaded inversely to each other and are connected through threaded holes of the transport plates 36*a* and 36*b*.

Another NC motor 34 for longitudinally transporting the frit pots 11 and 12 is mounted on supporting member 49 on bench 30. A threaded shaft 45 of NC motor 35 is rotatably supported at one end in said motor and is rotatably supported at the other end by support member 46 on bench 30. The shaft 45 is inserted through a threaded hole of a block (not shown) fixed to the lower surface of the transport table 44. The transport table 44 is slidably supported by a pair of rods 48 fixedly connected to supporting members 47*a*, two of which are not shown. An NC control apparatus (not shown) is operably connected to the NC motors 34 and 35.

The operation of the above-described apparatus is as follows. The drive mechanism 33 and the frit pots 11 and 12 are initially positioned as shown in FIG. 6. The nozzle portions 13 and 14 of the frit pots 11 and 12 are positioned adjacent to each other at the initial point. The shutters, i.e. valve means, of the nozzle portions 13 and 14 are opened. The NC motor 35 is driven in the normal direction by the NC control apparatus to rotate the shaft 31 at a predetermined speed. With the rotation of shaft 41, the transport plates 36*a* and 36*b* are moved in opposite directions, since the portions 41*a* and 41*b* of shaft 41 are threaded in opposite directions and are engaged with a threaded portion of transport plates 36*a* and 36*b*. Accordingly, the frit pots 11 and 12 carried by the transport plates 36*a* and 36*b* are transported in opposite directions at a predetermined speed along one longer side of the seal edge 1*a* of the funnel 1 while discharging frit slurry onto the seal edge 1*a*. When the nozzle portions 13 and 14 of frit pots 11 and 12 approach corners 1*d* and 1*e* of seal edge 1*a*, the other NC motor 34 starts and is driven in the normal direction by the NC control apparatus and rotates the threaded shaft 45 at a predetermined speed. With the rotation of the shaft 45, the transport table 44 engaged with the shaft 45 is moved toward the supported funnel 1. The nozzle portions 13 and 14 of the frit pots 11 and 12 with the composite movement of the transport plates 36*a* and 36*b* and the transport table 44 turn the corners 1*d* and 1*e* of the seal edge 1*a* discharging frit slurry onto the seal edge 1*a*. When the nozzle portions 13 and 14 of the frit pots 11 and 12 have finished turning the corners 1*d* and 1*e*, the NC motor 35 stops under the control of the NC apparatus. The nozzle portions 13 and 14 are then transported, respectively, along the shorter sides of the seal edge 1*a* at the predetermined speed discharging frit slurry onto the seal edge 1*a*. When the nozzle portions 13 and 14 approach corners 1*f* and 1*g* of the seal edge 1*a*, the NC motor 35 is started by the NC control apparatus and rotates the shaft 41 in the reverse direction at the predetermined speed. With the rotation of the shaft 41, the transport plates 36*a* and 36*b* engaged with the threaded portions 41*a* and 41*b* of the shaft 41 are moved toward each other. The nozzle portions 13 and 14 with the composite movement of the transport plates 36*a* and 36*b* and the transport table 44 turn the corners 1*f* and 1*g* of the seal edge 1*a* discharging frit slurry onto the seal edge 1*a*. When the nozzle portions 13 and 14 have finished turning the corners 1*f* and 1*g*, the NC control apparatus stops the NC motor 34 for longitudinally transporting the frit pots 11 and 12. The nozzle portions 13 and 14 are then transported toward each other along the other long side of the seal edge 1*a*, discharging frit slurry onto the seal edge 1*a*. When the nozzle portions 13 and 14 reach the terminal point positioned at the center of the other long side of the seal edge 1*a*, which corresponds to the terminal point 22 of FIG. 4, the NC motor 35 stops. The shutters of the nozzle portions 13 and 14 are then closed. The frit slurry coating operation is at this point completed and a unform continuous layer of frit slurry is formed on the seal edge 1*a*.

According to this invention, there is no swollen or nonuniform portion formed in the coated frit slurry layer on the seal edge 1*a*. Accordingly, the manual correction necessary in the prior art method is not required in order to obtain a uniform continuous layer of frit slurry. The frit slurry coating operation can thus in accordance with the present invention be automatically carried out. The deterioration of the insulation and/or conductivity of different parts of a cathode ray tube due to frit particles being scattered during the manual correction of the frit slurry layer is prevented. No expensive sanitary facilities are required.

While there have been described preferred embodiments of the invention, obvious modifications and variations are possible in light of the above teachings, for example, the guide rail 10 of FIG. 3 can be used with the apparatus of FIG. 6 and two of the apparatus of FIG. 6 can be disposed on opposite sides of a tube 1 of FIG. 6 to carry out the method described with respect to FIG. 5. The above invention, though described in relation to the application of a frit slurry to a television cathode ray tube loop to attach the tube to a panel portion, can obviously be used for applying other materials to other articles for other purposes. Conventional coating materials, sealants and adhesives can be used with various binders, carriers and/or solvents depending on the specific articles and the use to which the materials are to be put. The method and apparatus can, for example, be used to provide a continuous uniform coat of sealant to an edge surface. Non-viscous as well as viscous sealants and adhesives can also be used with suitable binders, carriers and/or solvents in the practice of the invention.

It is therefore to be understood that the invention may be practiced in ways other than as specifically described and that the scope of the invention is to be determined only by the appended claims.

What is claimed:

1. A method for applying a viscous material on a substantially horizontal, upwardly facing, loop-shaped surface of a seal edge of a portion of television cathode ray tube comprising the steps of:

disposing at least one pair of nozzle bodies containing said viscous material adjacent to and over but not in contact with the loop-shaped surface;

predetermining initial points and terminal points on said loop-shaped surface for each said pair of nozzle bodies with said initial points for each said pair of nozzle bodies being immediately adjacent each other, and with the terminal point for each of said nozzle bodies being immediately adjacent the terminal point for another of said nozzle bodies;

simultaneously moving said nozzle bodies along a path corresponding to said loop-shaped surface with the nozzle bodies of each said pair thereof being moved in opposite directions starting from said initial points thereof while, at the same time, keeping said nozzles aimed in a fixed direction relative to said surface and discharging the viscous material onto said surface; and substantially simultaneously halting the movement of said nozzle bodies at the respective terminal points and the discharge of said viscous material therefrom, whereby the loop-shaped surface is coated with a closed continuous, substantially uniform layer of the viscous material.

2. The method of claim 1; in which a single pair of said nozzle bodies is employed, and said terminal points for said nozzle bodies of said single pair are adjacent to each other.

3. The method of claim 1; in which first and second pairs of said nozzle bodies are employed, with the terminal point for each nozzle body of said first pair being adjacent the terminal point for a respective nozzle body of said second pair.

4. The method of claim 3; in which said first pair of nozzle bodies moves simultaneously and symmetrically with respect to said second pair of nozzle bodies.

5. The method of claim 1; in which said surface is held stationary while said nozzle bodies move.

6. The method of claim 1; in which said nozzle bodies are guided along said path.

7. The method of claim 1; wherein said loop-shaped surface is a seal edge of a funnel portion of a television cathode ray tube.

8. The method of claim 7; wherein said viscous material is a frit slurry.

* * * * *

UNITED STATES PATENT AND TRADEMARK OFFICE

CERTIFICATE OF CORRECTION

PATENT NO. : 4,137,341

DATED : January 30, 1979

INVENTOR(S) : Hiroshi Adachi

It is certified that error appears in the above-identified patent and that said Letters Patent are hereby corrected as shown below:

On the cover page please insert the following:

[30] Foreign Application Priority Data

June 6, 1975 [JP] Japan...........50-68756

Signed and Sealed this

*Sixteenth* Day of *October 1979*

[SEAL]

*Attest:*

RUTH C. MASON
*Attesting Officer*

LUTRELLE F. PARKER
*Acting Commissioner of Patents and Trademarks*